(12) United States Patent
Mathur (10) Patent No.: US 9,111,352 B2
(45) Date of Patent: Aug. 18, 2015

(54) AUTOMATED DETECTION AND CORRECTION OF STEREOSCOPIC EDGE VIOLATIONS

(71) Applicant: AVID TECHNOLOGY, INC., Burlington, MA (US)

(72) Inventor: Shailendra Mathur, Beaconsfield (CA)

(73) Assignee: Avid Technology, Inc., Burlington, MA (US)

( * ) Notice: Subject to any disclaimer, the term of this patent is extended or adjusted under 35 U.S.C. 154(b) by 257 days.

(21) Appl. No.: 13/721,306

(22) Filed: Dec. 20, 2012

(65) Prior Publication Data
US 2013/0163855 A1 Jun. 27, 2013

Related U.S. Application Data

(60) Provisional application No. 61/580,345, filed on Dec. 27, 2011.

(51) Int. Cl.
*G06K 9/00* (2006.01)
*G06T 7/00* (2006.01)
*H04N 13/00* (2006.01)

(52) U.S. Cl.
CPC .......... *G06T 7/0075* (2013.01); *H04N 13/0007* (2013.01)

(58) Field of Classification Search
CPC .......................... G06T 7/0075; H04N 13/0007
USPC ............... 382/154; 348/41, 51; 345/419, 427; 356/12
See application file for complete search history.

(56) References Cited

U.S. PATENT DOCUMENTS

| 2012/0082346 | A1* | 4/2012 | Katz et al. ............. 382/106 |
| 2012/0257816 | A1* | 10/2012 | Witt ..................... 382/154 |
| 2013/0010062 | A1* | 1/2013 | Redmann ................ 348/43 |
| 2013/0307928 | A1* | 11/2013 | Choe et al. .............. 348/43 |

OTHER PUBLICATIONS

3AlityTechnica Stereo Image Processor Data Sheet, 2010, 3 pags.
Sony Stereo Image Processor MPE-200 Data Sheet, 2 pages, Apr. 2011.
Broadcast Engineering, Cel-Soft develops automated edge-violation indicators for 3-D analyzer, Nov. 3, 2011, 3 pages.

* cited by examiner

*Primary Examiner* — Samir Ahmed
(74) *Attorney, Agent, or Firm* — Oliver Strimpel (57) ABSTRACT

Pixel-based and region-based methods, computer program products, and systems for detecting, flagging, highlighting on a display, and automatically fixing edge violations in stereoscopic images and video. The highlighting and display methods involve signed, clamped subtraction of one image of a stereo image pair from the other image, with the subtraction preferably isolated to a region of interest near the lateral edges. Various embodiments include limiting the detection, flagging, and highlighting of edge violations to objects causing a degree of perceptual discomfort greater than a user-set or preset threshold, or to objects having a certain size and/or proximity and/or degree of cut-off by a lateral edge of the left or right eye images of a stereo image pair. Methods of removing violations include automatic or semi-automatic cropping of the offending object, and depth shifting of the offending object onto the screen plane.

25 Claims, 7 Drawing Sheets

AUTOMATED DETECTION AND CORRECTION OF STEREOSCOPIC EDGE VIOLATIONS

CROSS REFERENCE TO RELATED APPLICATION

This application claims right of priority to and the benefit under 35 U.S.C. §119(e) of provisional patent application Ser. No. 61/580,345, filed Dec. 27, 2011, which is incorporated herein by reference.

BACKGROUND

In stereoscopic three dimensional (3D) productions, viewers may experience strain if the images do not adhere to the viewer's perceptual models. One way in which such perceptual models may be violated occurs when one depth cue conflicts with another. Here we are concerned with conflicts between occlusion, a monocular depth cue and parallax, which manifests itself as a difference in the apparent position of an object between the left eye and the right eye. When an occlusion cue for an object is generated as a result of the object being cut off by the edge of the viewing window of stereoscopic media conflicts with the parallax cue, the object is said to exhibit an edge violation. Such conflicts can arise when an object overlapping an edge of the window has negative parallax, i.e., the stereoscopic depth cue places the object in front of the plane of the screen, but the eye also perceives the object as being occluded by the edge of the viewing window. Edge violations are described in "3D Movie Making: Stereoscopic Digital Cinema from Script to Screen" by Bernard Mendiburu. With the increasing prevalence of stereoscopic 3D media production, there is a need for tools that assist editors and producers with issues that arise during shooting and post-production.

SUMMARY

In general, the methods, systems, and computer program products detect and display edge violations occurring within stereoscopic 3D media. Edge violations are detected by means of left/right view image differencing and by means of disparity. Furthermore, edge violations may be fixed automatically or with a certain degree of user input.

DETAILED DESCRIPTION

Figure 1A:
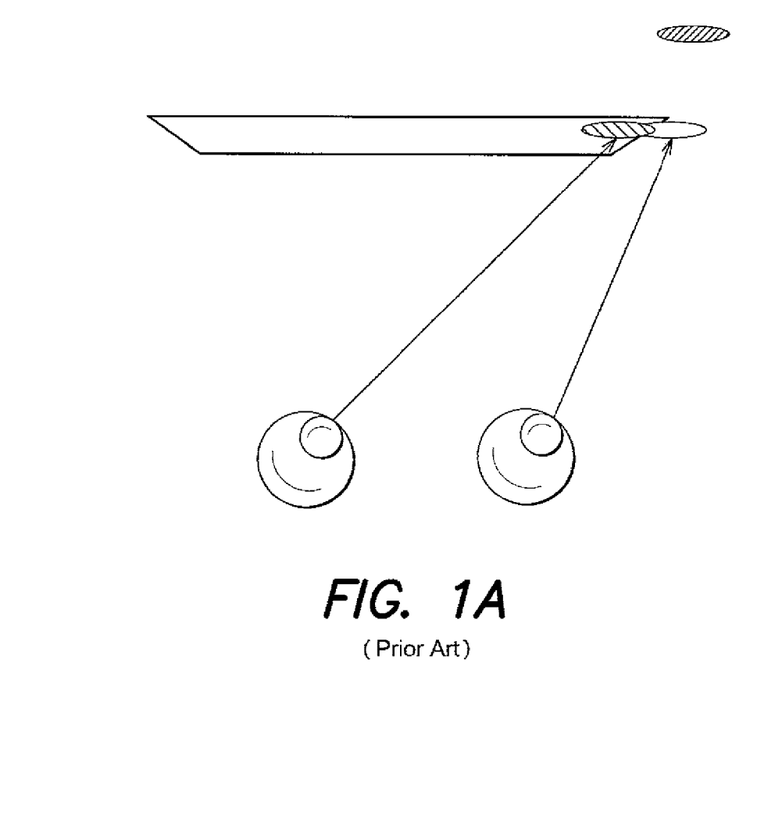
FIG. 1A is a diagram illustrating a lateral edge cut-off exhibiting no stereoscopic edge violation.
Figure 1B:
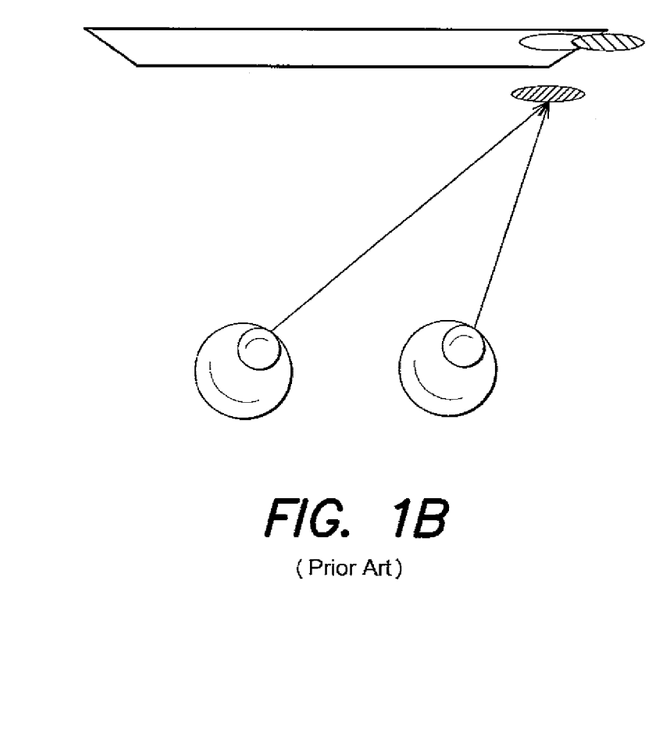
FIG. 1B is a diagram illustrating a lateral edge cut-off that does exhibit stereoscopic edge violation.

Edge violations occur in stereoscopic 3D media when the brain receives occlusion and parallax depth cues that conflict with each other. This situation can arise when the 3D media portrays an object near the edge of the viewing window, and at least part of the object in one of the stereo pair of images is cut off by a lateral edge of the image bounds. As used herein, lateral edge refers to an edge in the image whose direction has a non-zero component perpendicular to the direction of parallax displacement in the image, i.e., parallel to the inter-ocular axis of the viewer. In a rectangular image for a viewer with a horizontal inter-ocular axis, a lateral edge corresponds to a vertical left or right side edge. When this happens, the occlusion depth cue is telling the brain that the object must be behind the plane of the viewing window, since otherwise it could not be occluded by the edge of the window. If the parallax cue for the same object is also telling the brain that the object lies behind the plane of the viewing window, then there is no conflict, and no edge conflict arises. This situation is illustrated in FIG. 1A. On the other hand, if the parallax cue for the same object is telling the brain that the object lies in front of the viewing window, then a conflict arises and the brain becomes confused as to where to place the object and eye strain can ensue. An object exhibiting edge conflict on the right lateral edge of a viewing window is illustrated in FIG. 1B.

Edge violations can also occur when an object cut off by a lateral edge appears in one image of a stereo image pair, but not at all in the other image of the pair. As for the situation discussed above in which the object appears at least to some extent in both left and right eye images, an edge violation can occur for an object with negative parallax (i.e., in front of the viewing window). In the situation analogous to that shown in FIG. 1A in which an object that is cut off by the right lateral edge appears in the left eye image, but does not appear at all in the right eye image, the parallax cue places the object behind the viewing window (positive parallax). Since the occlusion cue also places the object behind the viewing window, no edge violation arises. However, in the situation analogous to that shown in FIG. 1B in which the object appears in the right eye image but is missing from the left eye image (negative parallax), the parallax cue places the object in front of the viewing window. Since the occlusion cue places the object behind the window, a conflict arises, giving rise to an edge violation.

The embodiments described herein automatically highlight the possible presence of edge violations in a stereo image pair. Image processing techniques are used to generate a suspected violation mask, which may be displayed on a screen of a computer-based media processing system. An editor may view the area, and readily determine whether an object exhibiting an edge violation is present in the stereo image pair. The stereo image pair may correspond to a stereoscopic still image, or it may be part of a sequence of images belonging to a stereo 3D video or film composition. In the latter case, a violation area may be generated for each image of the sequence, and displayed at video rates as a monoscopic violation area video. We now describe a series of steps for producing a violation area completely automatically, or with some input from an editor.

In the described embodiments, the normal orientation of displaying and viewing stereoscopic images will be assumed, in which rectangular images are displayed with lateral edges oriented vertically and top and bottom edges oriented horizontally. The parallax displacement of objects that are not in the plane of the viewing window is horizontal, which is consistent with a viewer having the left eye horizontally displaced from the right eye. However, the described embodiments may be used with non-rectangular images, and with other viewing orientations.

Objects having the potential to exhibit edge violations overlap a lateral edge of at least one image of an image pair. Such objects may be small enough in lateral extent to be wholly contained within a vertical band extending only a fraction into the image from the lateral edge. For objects that are confined to a band extending about 5% to 20% of the image width from a lateral edge, edge violations tend to be quite noticeable, and it is desirable to detect the violation and fix it. On the other hand, for objects that extend beyond such a band, depth cues such as occlusion, size, color and brightness tend to dominate the viewer's perception, and even if an edge violation is present, it is less noticeable. It may not be necessary or desirable to detect or fix edge violations that occur for such objects. Thus, in order to generate edge violation warnings and offer fixes only for those objects that may be bothersome to the viewer, edge violation analysis may optionally be limited to a specific region of interest, such as a vertical band adjacent to the left and right edges of an image. The width of the vertical band corresponding to the region of interest may be selected by an editor, such as by specifying a fraction of the image width or a number of pixels. In some situations it may be set automatically, using a default value or deriving an appropriate width as a function of other parameters or quantities, such the nature of the program being analyzed (e.g., program content, stage in a production workflow, intended viewing venue), and geometric parameters (e.g., physical screen size, anticipated viewer position). The band can be expressed as an image mask which we refer to as the region of interest mask that uses standard masking operations (such as a multiplication of the mask value with the image) to isolate the regions of the stereo image that need to be processed to detect objects in the image exhibiting edge violations. In the case where all pixels in an image region up to a certain extent from the edge need to be considered, the mask can contain binary values. The horizontal profile of the mask going from one edge of the image to the other can be seen as containing two edge functions. As an alternative it is also possible to utilize a variable masking region with different weights being applied to the consideration of objects in the image depending on distance from the edges. An example of a continuous profile can be a smoothly varying half-Gaussian ramp down from a chosen width for the band mask. This mask profile can be under the control of the user, or be set automatically.

The image processing steps described below for automatically generating a violation mask exploit the following observations. An edge-violating object with negative parallax that is cut off by the right edge of the stereo window occupies a larger spatial region near the right edge within the right eye image compared to the spatial region it occupies near the right edge within the left eye image, in which the object may even be completely absent. Similarly, an edge-violating negative parallax object that is cut off on the left periphery of the stereo image occupies a larger region near the left edge of the left eye image than it does near the left edge of the right eye image, where it may be completely absent. Therefore, an appropriately determined difference between regions occupied by the object in the left and right images indicates the likely presence of an edge violation.

Another alternative image processing step is to calculate the signed disparity vectors within the regions isolated by the region of interest masking.

In both the differencing and or disparity vector utilization, the sign of the resulting value is important. In the same region of interest masks, there will be objects that are cut off by the edges of the image but that do not cause a perceptual problem since they have positive parallax (behind the screen plane). In that case the relative size assumptions between the left and right eye are reversed, and thus the sign of the difference or the sign of the disparity vector is important. If on the right edge of the right and left image, a positive difference value in the subtraction of the left image value from the corresponding right image value will be considered and negative difference values will be discarded. Similarly on the left edge, the positive difference value in the subtraction of the right image value from the corresponding left image value will be considered and the negative values will be discarded. In the case of disparity vectors, only the negative disparity vectors representing negative parallax will be considered.

Figure 2:
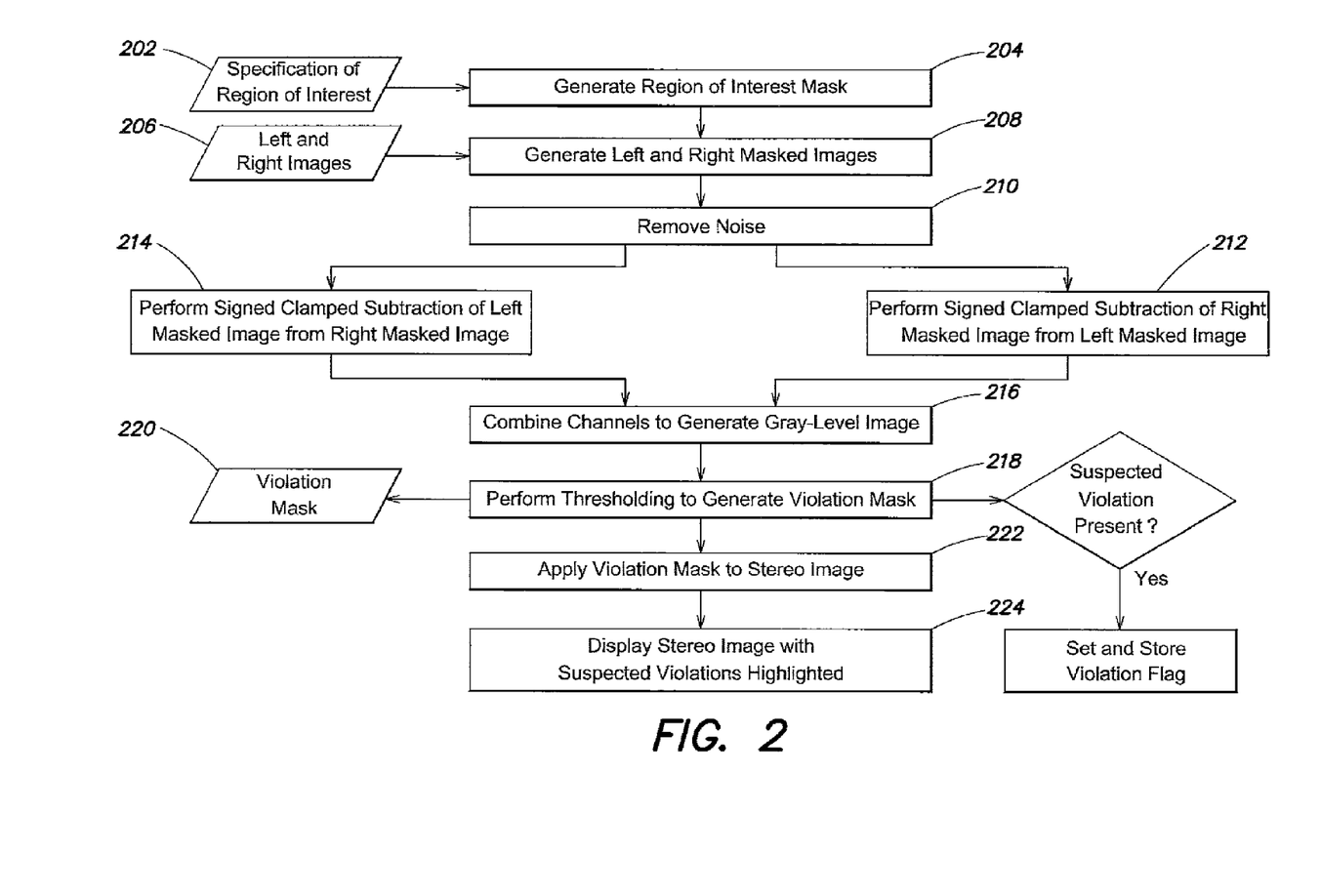
FIG. 2 is a high level flow diagram of a process for automatically displaying regions in a stereoscopic image exhibiting edge violations.

Referring to the high level flow diagram shown in FIG. 2, the specification of the region of interest (202) is used to generate a region of interest mask (204). For example, such a mask may be transparent (white) in regions corresponding to the region of interest and opaque (black) elsewhere. Next, the region of interest mask is applied to the left and right images of a stereo image pair (206) to generate left and right masked images (208). This step may be achieved by performing a multiplication blending operation between each of the left and right images of a stereo pair with the region of interest mask. The multiplication blending serves to reduce the image pair being analyzed to the regions corresponding to the regions of interest, thus isolating subsequent processing to objects in edge regions of the viewing window.

The resulting, masked image is optionally subjected to noise removal (210) so as to eliminate artifacts that could appear as false objects. Examples of noise include video signal noise, small objects that are below the size threshold of interest that are not noticed by the eye.

In the next step, a signed subtraction or a disparity calculation is performed between the left eye image and the right eye masked image with the appropriate clamping to the required signed value as explained above, to identify the negative parallax objects at the edge. To reveal objects exhibiting violations on the left side of the stereo image, the left masked region of the right eye image is subtracted from the left masked region of the left eye image (212). Conversely, to reveal objects exhibiting violations on the right side of the stereo image, the right masked region of the left eye is subtracted from the right masked region of the right eye (214). The resulting image is referred to as a difference image. Alternatively, disparity vectors can be extracted using standard disparity generating algorithms such as the ones found in the opensource OpenCV library (e.g., the cvFindStereoCorrespondence( ) function). With only the negative disparity values considered, we also consider the image containing the disparity values as a difference image.

The difference image is subjected to a channel-combining operation (216) to convert the color values (e.g., RGB) of the pixels in the difference image to gray-level brightness values. The brightness values are then converted into a binary image using a thresholding filter to isolate brightness value differences that exceed a threshold value (218). The thresholding process serves to eliminate small differences between left and right eye images caused by noise. Additionally, a morphophological filter such as a media filter can be used to eliminate differences or disparity due to small objects that might not exhibit edge violations.

The output of the thresholding process is the violation mask (220), i.e., a mask that is opaque, preferably having pixel values corresponding to a bright "warning" color for regions of the stereo image that exhibit edge violation and transparent otherwise. Note that the mask only reveals the non-overlapping portions at the periphery of the violating object as it appears in the left eye and in the right eye images. In order to show the edge violations in the context of the stereo image having the suspected violation, the edge violation mask is applied to the stereo image (222) and displayed (224). The mask is used to composite a color or with a distinctive in-fill pattern on top of the left and right image, effectively highlighting the regions of the stereo image where objects exhibit edge violations are highlighted with the warning color or with a distinctive infill pattern. For example, the violating regions may be colored bright yellow and displayed on a graphical output screen of the media processing system. The masked image may then be displayed on a display of a media processing system, and an editor is made aware of the presence and location of objects exhibiting edge violations.

Figure 3:
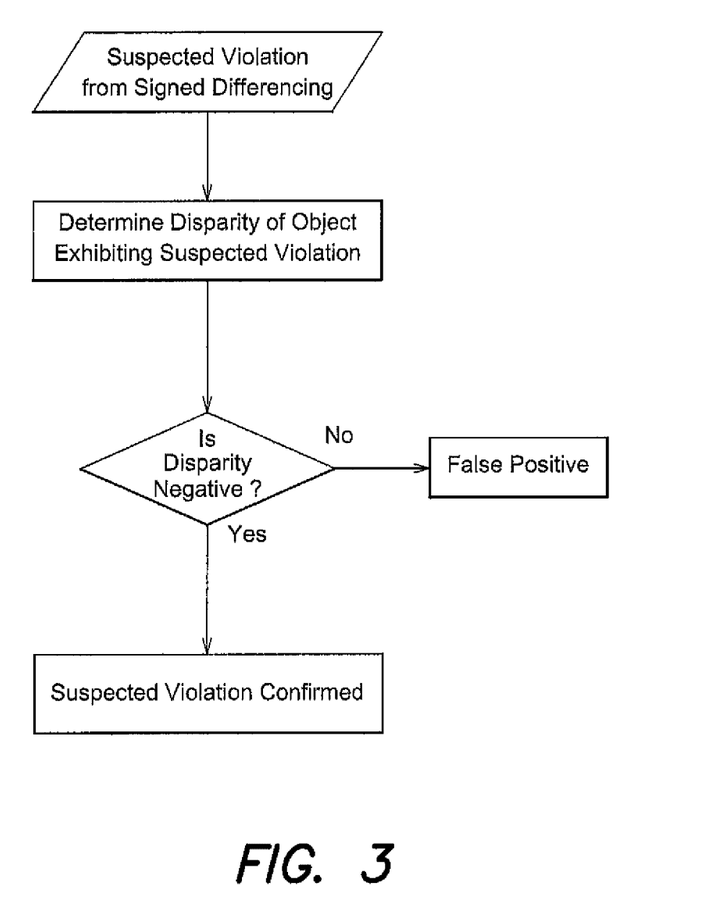
FIG. 3 a flow diagram for confirming suspected edge violations.

The determination of a suspected stereo edge violation using the signed difference methods described above is a computationally inexpensive process. However, under certain circumstances it may falsely identify certain objects or regions as exhibiting an edge violation. By contrast, disparity methods are more computationally expensive, but are less susceptible to producing false positives. FIG. 3 illustrates an efficient workflow in which an initial run on a series of stereoscopic video frames is performed using the differencing method to flag frames exhibiting suspected stereo edge violations. Subsequently, only flagged frames are analyzed using disparity, and if the suspected objects in the flagged frames exhibit negative disparity, the suspected violation is confirmed. Otherwise, the flagged frame represents a false violation detection and the violation flag is removed.

Figure 4A:
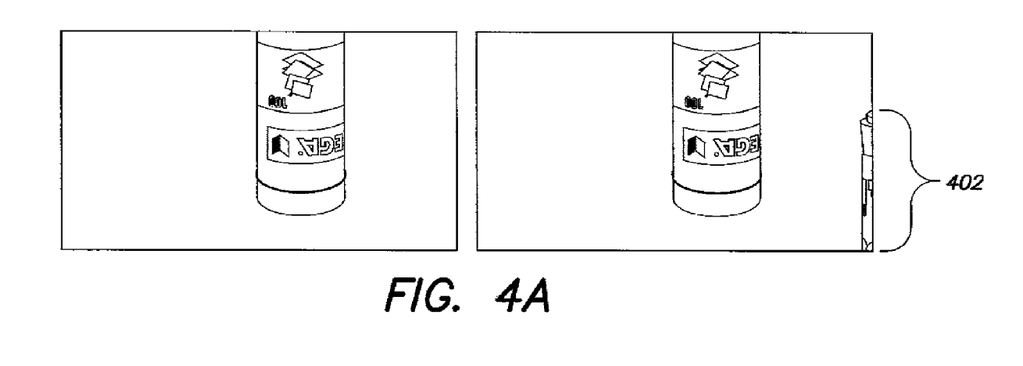
FIG. 4A illustrates a stereo image pair with an object exhibiting edge violation at the right edge.
Figure 4B:
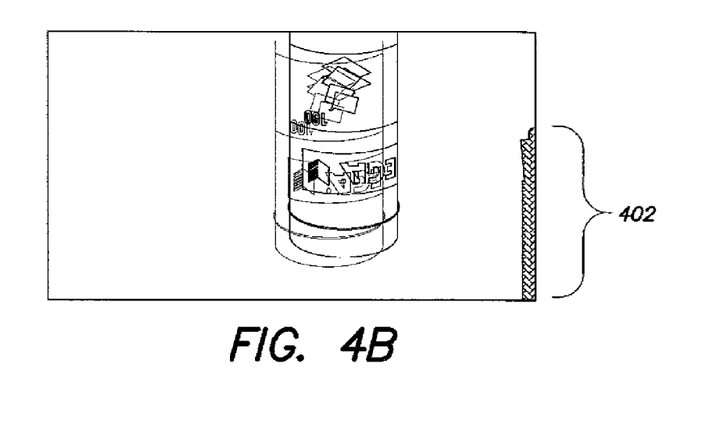
FIG. 4B illustrates an anaglyph representation of a stereoscopic image in which the object exhibiting edge violation is highlighted.

An example of automatic edge violation detection and display is illustrated in FIGS. 4A and 4B. FIG. 4A shows a stereo image pair in which object 402 appears cut off by the right edge of the right eye image and is absent from the left eye image. Since this situation can only arise if the parallax of the object is negative, the object exhibits an edge violation. The image processing steps described above generate a violation mask, which is used to display a stereoscopic image in which the region of the object exhibiting edge violation is highlighted with a bright color, such as bright yellow, which is designated in the figure as a herringbone infill. In this example, since the object is absent from the left eye image, the region of violation corresponds to the entire region of the object showing in the right eye image.

The region of interest mask only serves as an approximate localization of objects that may exhibit edge violations. There may be instances of objects that fall in the region of interest mask, however do not get occluded by the edge of the image. To address this aspect, an extra image region analysis can be performed to detect an actual intersection of the object with the edge. To accomplish this, beyond a difference map or a disparity map that may primarily highlight regions around the highly textured or edges of the object, the full region that the object occupies needs to be identified. Such figure ground segmentation may be performed by using region-growing algorithms such as ones presented in R. C. Gonzalez and R. E. Woods, "Digital Image Processing 2nd Edition, Prentice Hall, N.J., 2002." or by W. K. Pratt, "Digital Image Processing" 4th Edition, John Wiley & Sons, Inc., Los Altos, Calif., 2007. Additional texture in-filling algorithms that can be used are presented by Criminisi et al. in "Region Filling and Object Removal by Exemplar-Based Image Inpainting," IEEE Trans on Image Processing, Vol. 13, No 9, September 2004. The pixels identified in the difference image are used as seed points in the images to drive the region identification of the object. Once the region is identified, a simple intersection test of the connected region can be performed by comparing the X,Y coordinates of the pixels in the in-filled areas with extents in the X direction of the image. Only those connected pixel regions in the difference image that intersect with the edge of the image are then identified as the violation mask A violation mask created using the region based analysis may be used as the basis for the compositing-based edge violation fixing methods described above. Using such a violation mask may be advantageous since rather than just the region of the foreground image that corresponded to the difference, a more continuous and larger region of the object from the foreground image is composited, which may reduce visual artifacts.

The various pixel and image processing steps described may be performed using a media editing system, such as a non-linear video editor software application running on a client computer or in the cloud. Examples of such editing systems include non-linear video editors such as Media Composer®, described in part in U.S. Pat. Nos. 5,267,351 and 5,355,450, which are incorporated by reference herein, DS from Avid. Technology, Inc. of Burlington, Mass., and Final Cut Pro® from Apple Computer, Inc. of Cupertino Calif.

Figure 5:
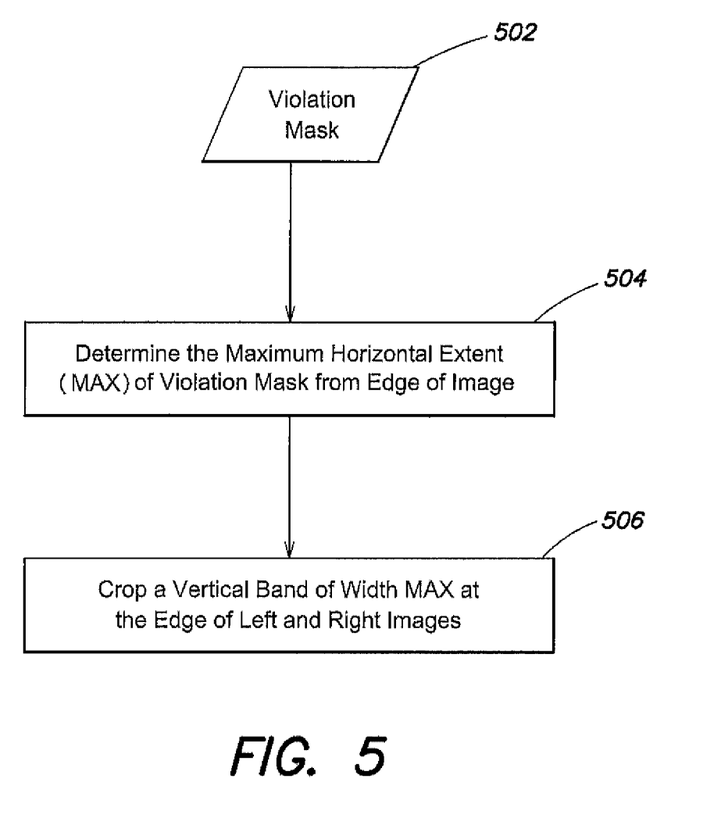
FIG. 5 is a high level flow diagram of an automatic cropping process for fixing edge violation.

Once a region exhibiting edge violation is detected, the violation may be eliminated automatically. Two approaches are described: cropping and depth adjustment. Cropping eliminates the violation by removing corresponding portions of the left and right eye images that exhibit the violation. Cropping produces the perceptual effect of a floating window, i.e., a window that is angled towards the viewer at the side corresponding to the edge that was cropped, thus foreshortening the apparent width of the window. FIG. 5 is a high level flow diagram showing the steps involved. Violation mask 502, generated by a process such as that described above, is analyzed to determine the maximum horizontal extent of an edge-violating region from the vertical edge causing the violation (504). This distance then defines the width of a vertical band extending into the image to be cropped (506). With this portion cropped, the object exhibiting the edge violation no longer appears in the image Disadvantages of the cropping method include the loss of some image data and objects at the edge of the image, and the apparent pivoting of the floating window towards the viewer at the edge causing the violation.

Figure 6:
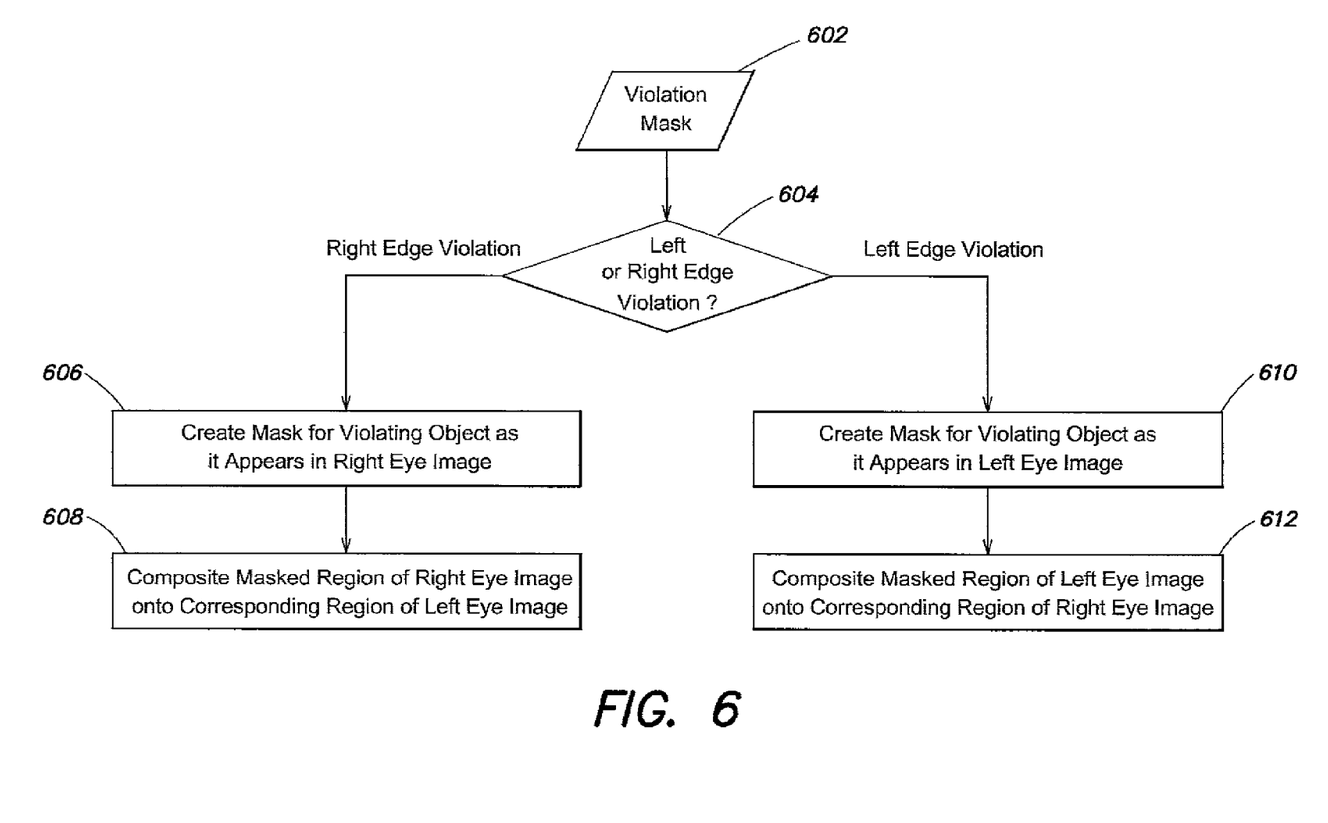
FIG. 6 is a high level flow diagram of a depth-shifting process for fixing edge violation.
Figure 7:
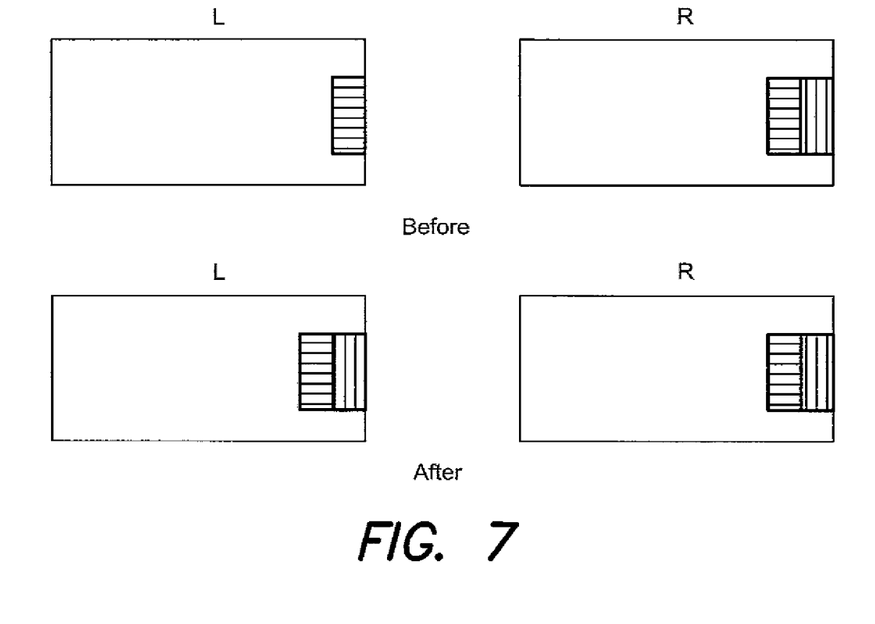
FIG. 7 is an illustration of a compositing method for fixing edge violation by depth-shifting.

A second method of removing edge violation is to adjust the apparent depth of the violating object so that it moves away from the viewer onto the plane of the viewing window. The process involves using the violation mask, which is essentially a difference mask between left and right eye images, to composite the pixels of the violating object in the image which shows more of the object onto the corresponding region of the image which shows less (or none) of the object. The effect of this composting is an in-filling operation for the image that originally showed less (or none) of the object. The perceptual effect of having the same object values present on corresponding locations of the left and right eye image is to place the object on the screen plane. With the partially revealed object now sitting at the same depth location as the stereo viewing window, no depth cue mismatch arises, and the edge violation is eliminated, or in other cases, perceptually lessened. FIG. 6 is a flow diagram of the steps involved in performing automatic edge violation fixing using depth adjustment. Using violation mask 602, a determination is made as to which lateral edge is causing the violation (604). For right edge violations, a mask is created that isolates the violating object as it appears in the right eye image (606) and the mask is composited with the corresponding region of the left eye image (608), which has the effect of creating an identical copy of the object in both images. With parallax removed, the object appears to be placed on the plane of the screen, A similar process is performed if the violating object is cut off by the fight left side edge (610, 612). FIG. 7 is an illustration of a compositing method for fixing edge violation by depth-shifting, in which the object from the right eye image is isolated, and composited onto the corresponding region of the left eye image. With the parallax (disparity) removed, the object now appears in the screen plane, and the edge violation is eliminated.

Depth adjustment fixing has the advantage of not losing any image data; no objects are eliminated from the scene. However, a depth shifting operation has the potential to generate new conflicts if, for example, occlusion or relative size relationships between the object and other objects in the scene are affected. For this reason, it is preferable to limit depth shifting edge violation correction to objects that are wholly contained within a region of interest near the lateral edges of the stereo image. For such objects, the impact of edge violation is likely to dominate over other depth cues, and the benefit derived from correcting the edge violation generally outweighs any confusion that might be generated from upsetting other depth cues. However, the reverse is generally true for objects that extend beyond the region of interest near the edges towards the central region of the image. Here, occlusion between the violating object and other objects in the central portion of the image as well as apparent size, motion, and lighting cues are likely to dominate, and any edge violation exhibited by such objects is less likely to be noticed and cause discomfort.

Since each of the edge violation techniques described may have negative consequences, it is advantageous to enable an editor to determine whether the benefit of removing an object exhibiting a violation outweighs the disadvantages. Thus, in some embodiments, editor approval is required before a crop or depth adjustment is performed. When a stereo image is part of an image sequence of stereo film or video, the editor's approval is sought only at given temporal intervals, or when a new object appears or there is a scene change. Once the editor selects an object for edge violation fixing, a media processing system may automatically perform the fix for all images in the portion of the video sequence in which the object appears and exhibits the violation. For depth shifting correction, the fix may be terminated if and when the object moves beyond the region of interest. In this manner, while the detection of edge violations remains fully automatic, the fixing process is semi-automatic. An editor may elect to have an all edge violations in a video corrected without user intervention, while issuing a flag or other indication that edge violations were detected and removed.

Automatic edge violation detection and display can be performed at any stage of a production workflow. In general, an operator, such as a cameraman, editor, stereo grip, stereographer, visual effects artist, quality control specialist (as part of meeting broadcast standards), or a post-production editor views the stereo images blended with the violation mask on a graphical display of as media processing system. Violating regions are then readily identified by the distinctive color or infill assigned to violations. The operator may flag such regions for correction, or elect not to correct them.

During stereo video capture, stereo image processing components associated with stereo rig ingest systems may use the described methods to display offending regions. Adjustments may then be made in the cameras, or in the scene being captured.

Once the stereo media has been captured, editors may use the image display of a media editing or dailies production system to detect violations before the media is transferred to post-production editing or visual effects production. Further along the production workflow, post-production and visual effects editors may make changes to stereo convergence, which have the potential to introduce edge violations as a result of pushing objects cut off by an edge from positive parallax to negative parallax as part of the reconvergence process. Automatic detection and visualization of any violations caused are displayed, and the reconvergence may be adjusted accordingly to prevent violations from occurring. Similarly, edge violations that are inadvertently introduced during depth grading may readily be flagged and addressed.

In some workflows that involve broadcast software or hardware systems to perform media processing, a quality control pass is performed on all media passing through the system. The media passes through an analyzer that applies certain thresholds to determine whether the media is of transmission quality. As is routinely performed to screen media for broadcast safe colors, the presence of edge violations may also be searched for. Optionally, a system identifies the frames exhibiting edge violations and sends back the media to the submitting party for correction. The system may return just an indication of which frames are affected, such as clip name, frame numbers and/or timecode, or it may also determine the pixel regions affected, generate a mask raster associated with the frame number, timecode and clip name, and return the mask for each affected frame. The system includes a non-transitory storage device, such as a magnetic, optical or flash memory drive, and stores the indication of the violation.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from, magnetic, optical, or solid state drives, which may include an array of local or network attached disks.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of identifying an edge violation in a stereoscopic image pair having a left eye image and a right eye image, the method comprising:
   analyzing the left eye image to determine whether the left eye image includes an object that is cut off by a lateral boundary of the left eye image;
   analyzing the right eye image to determine whether the right eye image includes an object that is cut off by a lateral boundary of the right eye image; and
   if at least one of the analyzing steps determines that one of the left eye and the right eye images includes an object that is cut off by a lateral boundary and is wholly contained within a region of interest:
      if the object is cut off by a left lateral boundary of the left eye image, generating a difference image by performing a signed subtraction of at least the region of interest of the right eye image from a corresponding region of the left eye image with clamping of the resulting difference image to legal pixel values;
      if the object is cut off by a right lateral boundary of the right eye image, generating a difference image by performing a signed subtraction of at least the region of interest of the left eye image from a corresponding region of the right eye image with clamping of the resulting difference image to legal pixel values;
      if the stereoscopic image pair is encoded in a multi-channel color space, generating a gray-level difference image by converting multi-channel pixel values in the difference image to gray-level brightness values;
      generating a violation mask by performing a thresholding operation on the difference image; and
      on a graphical user interface of a media processing system, displaying an indication of a suspected edge violation of the object in a region of the stereo image pair corresponding to the violation mask.

2. The method of claim 1, wherein the region of interest of the left eye image and right eye image are defined as a region within a given distance of a lateral edge of the left eye image and the right eye image respectively.

3. The method of claim 2, wherein the given distance is greater than about five percent and less than about fifteen percent of a lateral extent of the left eye image and the right eye image.

4. The method of claim 1, wherein the region of interest comprises essentially the entire left eye image and right eye images.

5. The method of claim 1, wherein the portion of the left eye image and the portion of the right eye image correspond to the region of interest.

6. The method of claim 1, further comprising removing noise from the left and right eye images prior to generating the difference image.

7. The method of claim 1, wherein the stereoscopic image pair is a member of a sequence of stereoscopic image pairs of a stereoscopic video composition.

8. The method of claim 7 further comprising:
   for each of the stereoscopic image pairs of the video composition other than the first-mentioned stereo image pair, performing the steps of claim 1 to that stereo image pair.

9. The method of claim 8 further comprising storing the indication in a memory of the media processing system.

10. The method of claim 8 further comprising setting a flag associated with the stereoscopic video composition if at least one of the image pairs includes an object exhibiting a suspected edge violation.

11. The method of claim 1 further comprising storing the indication in a memory of the media processing system.

12. The method of claim 1, further comprising removing the suspected violation by:
   determining a crop dimension equal to a maximum horizontal extent of the violation mask from an edge of one of the left eye image and the right eye image; and
   cropping a vertical band of width equal to the crop dimension from corresponding edges of the left eye image and the right eye image responsible for the suspected edge violation.

13. The method of claim 1, further comprising removing the suspected violation by adjusting an apparent depth of the object onto the plane of a viewing window of the stereoscopic image pair.

14. The method of claim 13, wherein adjusting an apparent depth of the object onto the plane of the viewing window comprises:
  if the suspected violation is caused by a right lateral boundary of the stereoscopic image pair:
    creating a mask for the object as it appears in the right eye image; and
    compositing a masked region from the mask of the right eye image onto a corresponding region of the left eye image; and
  if the suspected violation is caused by a left lateral boundary of the stereoscopic image pair:
    creating a mask for the object as it appears in the left eye image; and
    compositing a masked region from the mask of the left eye image onto a corresponding region of the right eye image.

15. The method of claim 1, further comprising:
  receiving disparity information for the object;
  if the disparity information indicates a negative disparity, outputting a confirmation that the object exhibits an edge violation; and
  if the disparity information indicates a positive disparity for the object, cancelling the indication of a suspected edge violation.

16. The method of claim 15, further comprising removing the edge violation by adjusting an apparent depth of the object onto the plane of a viewing window of the stereoscopic image pair.

17. The method of claim 1, further comprising:
  if the object is cut off by a left lateral boundary of the left eye image:
    determining a spatial dimension of the object in the left eye image;
      if the object appears in the right eye image, determining a spatial dimension of the object in the right eye image, and if the spatial dimension of the object in the left eye image is greater than the spatial dimension of the object in the right eye image, outputting a further indication of a suspected edge violation; and
      if the object does not appear in the right eye image, outputting a further indication of a suspected edge violation; and
  if the object is cut off by a right lateral boundary of the right eye image:
    determining a spatial dimension of the object in the right eye image;
      if the object appears in the left eye image, determining a spatial dimension of the object in the left eye image, and if the spatial dimension of the object in the right eye image is greater than the spatial dimension of the object in the left eye image, outputting a further indication of a suspected edge violation; and
      if the object does not appear in the left eye image, outputting a further indication of a suspected edge violation.

18. The method of claim 1, further comprising:
  receiving disparity information for the object; and
    if the disparity information for the object indicates a negative disparity, outputting a further indication of a suspected edge violation.

19. The method of claim 18, further comprising removing the suspected edge violation exhibited by the object by:
  determining a crop dimension equal to a maximum horizontal extent of the object from an edge of one of the left eye image and the right eye image; and
  cropping a vertical band of width equal to the crop dimension from corresponding edges of the left eye image and the right eye image responsible for the suspected edge violation.

20. The method of claim 18, further comprising removing the suspected edge violation exhibited by the object by adjusting an apparent depth of the object onto the plane of a viewing window of the stereoscopic image pair.

21. The method of claim 20, wherein adjusting an apparent depth of the object onto the plane of the viewing window comprises:
  if the suspected violation is caused by a right lateral boundary of the stereoscopic image pair:
    creating a mask for the object as it appears in the right eye image; and
    compositing a masked region from the mask of the right eye image onto a corresponding region of the left eye image; and
  if the suspected violation is caused by a left lateral boundary of the stereoscopic image pair:
    creating a mask for the object as it appears in the left eye image; and
    compositing a masked region from the mask of the left eye image onto a corresponding region of the right eye image.

22. The method of claim 1, further comprising:
  if an indication of a suspected edge violation is output, editing at least one of the left eye image and the right eye image to remove the suspected edge violation.

23. The method of claim 22, wherein the editing step comprises adjusting an apparent depth of the object onto the plane of a viewing window of the stereoscopic image pair.

24. The method of claim 22, wherein the editing step comprises cropping a portion of at least one of the left eye image and the right eye image that includes the object.

25. A computer program product comprising:
  a non-transitory computer-readable medium with computer program instructions encoded thereon, wherein the computer program instructions, when processed by a computer, instruct the computer to perform a method of identifying edge violation in a stereoscopic image pair having a left eye image and a right eye image, the method comprising:
    analyzing the left eye image to determine whether the left eye image includes an object that is cut off by a lateral boundary of the left eye image;
    analyzing the right eye image to determine whether the right eye image includes an object that is cut off by a lateral boundary of the right eye image; and
    if at least one of the analyzing steps determines that one of the left eye and the right eye images includes an object that is cut off by a lateral boundary and is wholly contained within a region of interest:
      if the object is cut off by a left lateral boundary of the left eye image, generating a difference image by performing a signed subtraction of at least the region of interest of the right eye image from a corresponding region of the left eye image with clamping of the resulting difference image to legal pixel values;
      if the object is cut off by a right lateral boundary of the right eye image, generating a difference image by performing a signed subtraction of at least the region of interest of the left eye image from a corresponding region of the right eye image with clamping of the resulting difference image to legal pixel values;

if the stereoscopic image pair is encoded in a multi-channel color space, generating a gray-level difference image by converting multi-channel pixel values in the difference image to gray-level brightness values;

generating a violation mask by performing a thresholding operation on the difference image; and on a graphical user interface of a media processing system, displaying an indication of a suspected edge violation of the object in a region of the stereo image pair corresponding to the violation mask.

* * * * *